United States Patent [19]

Yamamoto

[11] Patent Number: 5,914,635
[45] Date of Patent: Jun. 22, 1999

[54] SEMICONDUCTOR AMPLIFIER CIRCUIT WHICH ELIMINATES AN UNSATURATED STATE CAUSED BY A PULL-UP RESISTOR

[75] Inventor: Masahiro Yamamoto, Tokyo, Japan

[73] Assignee: Mitsubishi Denki Kabushiki Kaisha, Tokyo, Japan

[21] Appl. No.: 08/645,720

[22] Filed: May 14, 1996

[30] Foreign Application Priority Data

Dec. 19, 1995 [JP] Japan ..................................... 7-330338

[51] Int. Cl.$^6$ ....................................................... G06G 7/12
[52] U.S. Cl. .......................... 327/561; 327/307; 327/331
[58] Field of Search .................................... 327/561, 588, 327/307, 331; 73/708, 721, 727; 324/207.12

[56] References Cited

U.S. PATENT DOCUMENTS

| 4,190,796 | 2/1980 | Ishii ....................................... 323/280 |
| 4,529,891 | 7/1985 | Oida ....................................... 330/257 |
| 4,564,281 | 1/1986 | Takemae et al. ........................ 396/243 |
| 4,672,326 | 6/1987 | Cini et al. ............................... 330/254 |
| 4,687,994 | 8/1987 | Fulkerson et al. ...................... 324/251 |
| 4,785,258 | 11/1988 | Westwick ............................. 330/253 |
| 4,912,429 | 3/1990 | Takato et al. ........................... 330/261 |
| 4,914,387 | 4/1990 | Santos .................................... 324/166 |
| 5,384,549 | 1/1995 | Araki ..................................... 330/298 |
| 5,473,253 | 12/1995 | Araki ..................................... 324/537 |

FOREIGN PATENT DOCUMENTS

| 3037888 | 4/1981 | Germany . |
| 4400437 | 7/1994 | Germany . |
| 2060184 | 4/1981 | United Kingdom . |

OTHER PUBLICATIONS

Design u. Elektronik Sensortechnik, special issue Oct. 1993, pp. 36–37.
Rentzsch: Begriffe der Elektronik, Franzis Verlag GmbH, Muenchen, 1989, p. 359.
H.D. Junge, A. Moscgwukzer:Lexikon Elektronik, VCH–Belag Weinheim, 1994, pp. 43–44.
messen prufen automatisieren, Mar. 1989, pp. 112–114.

*Primary Examiner*—Kenneth B. Wells

[57] ABSTRACT

A semiconductor sensor device using a semiconductor material for the sensor and having a circuit configuration in which the operational amplifier of the final amplification stage forms an inverting amplifier circuit, and a pull-up resistance is connected to the output terminal of the operational amplifier, includes a saturation circuit for saturating the output voltage of the operational amplifier when the voltage of the inverting input terminal of the operational amplifier of the final amplification stage drops below a voltage value $\alpha$ at which the output voltage from the output terminal is saturated.

2 Claims, 5 Drawing Sheets

SEMICONDUCTOR AMPLIFIER CIRCUIT WHICH ELIMINATES AN UNSATURATED STATE CAUSED BY A PULL-UP RESISTOR

BACKGROUND OF THE INVENTION

1. Field of the Invention

The present invention relates to semiconductor sensors forming a strain detection element on or in a semiconductor substrate, and converting the change in the resistance of said strain detection element caused by elastic deformation to an electrical signal, and relates particularly, for example, to a semiconductor pressure sensor used for automotive fuel injection control and a semiconductor acceleration sensor used in antilock brake systems (ABS) or supplemental restraint systems (SRS) in motor vehicles.

Figure 5:
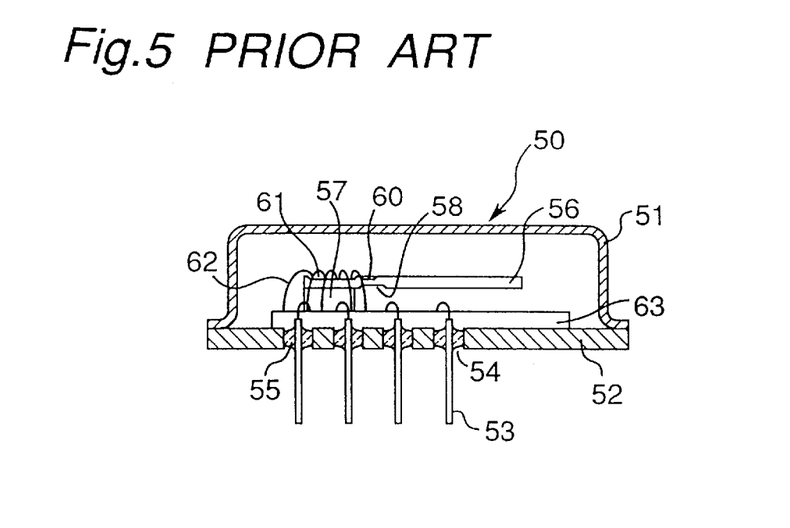
FIG. 5 is a partial cross section diagram of the internal structure of a semiconductor acceleration sensor according to the prior art.

2. Description of the Prior Art is FIG. 5 is a partial cross section diagram showing the internal structure of a semiconductor acceleration sensor according to the prior art. Referring to FIG. 5, semiconductor acceleration sensor 50 is a hermetically sealed package having a cap 51 and a stem 52 formed from cobalt or another metal, and conductive leads 53 for establishing an electrical connection between the package and other external components. The cap 51 is a box-like member of which one of the sides of the greatest area is open. The cap 51 is welded to the stem 52, which is a large plate-like member, in such a manner that the stem 52 closes the open side of the cap 51. Note that the perimeter of the open end of the cap 51 is flanged to facilitate welding to the stem 52.

Through-holes 54 are provided in the stem 52 in a number matching the number of conductive leads 53. Tubes of a hardened glass are inserted to these holes in the stem 52, and the conductive leads 53 are inserted to the glass tubes. Heat is then applied to melt and fuse the glass tubes to the conductive leads 53, forming a glass seal 55 around each lead and fastening each lead in the corresponding through-hole 54 of the stem 52. When the cap 51 is then welded to the stem 52, the inside of the cap 51 is sealed, and the stem 52 and conductive leads 53 are electrically insulated from each other by the glass seals 55.

One end of the sensor chip 56 of the semiconductor acceleration sensor 50 is fastened to a seating 57, forming the fixed end of a cantilever structure. The sensor chip 56 is, for example, an n-type monocrystalline silicon. The back of the sensor chip 56 is etched to form a thin-wall diaphragm 58, on the surface of which is formed an acceleration detection element 60.

The acceleration detection element 60 is formed by forming four resistances (piezoresistances) utilizing the piezoresistance effect by thermal diffusing or ion injecting boron or another p-type impurity to the surface of the diaphragm 58. The four resistances are then wired together into a bridge circuit by means of aluminum leads formed, for example, by vapor deposition, or diffusion leads formed by doping a high concentration p-type impurity to the diaphragm surface. Stress is thus concentrated on the piezoresistances.

When stress caused by acceleration acts on the sensor chip 56, the sensor chip 56 deflects at the diaphragm 58, thus producing strain in the diaphragm 58. The resistance of the piezoresistances changes according to the rate of acceleration, and an unbalanced voltage is generated at the output terminal of the bridge circuit if a voltage is preapplied to the bridge circuit. The acceleration can then be detected from this unbalanced voltage (the "acceleration signal" below). The acceleration signal, however, is a very small signal, and a signal processing circuit 61 such as a signal amplification circuit, diagnosis circuit, or error detection circuit, is formed at the fixed-end side of the sensor chip 56.

The signal processing circuit 61 is connected by gold or aluminum bonding wires 62 to a hybrid IC 63 comprising a sensitivity adjusting thick-film resistance or offset-adjusting thick-film resistance. The hybrid IC 63 is further connected by bonding wires 62 to the conductive leads 53. As a result, the acceleration signal amplified by the signal processing circuit 61 is first corrected by the hybrid IC 63, and then output from conductive leads 53 to an external microcomputer or other device.

Figure 6:
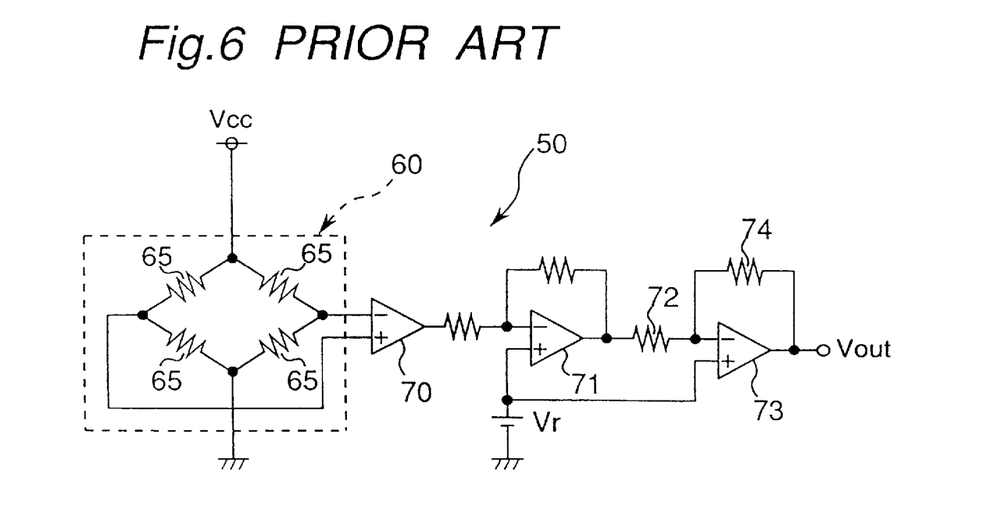
FIG. 6 is a circuit diagram of an amplification circuit in a semiconductor acceleration sensor according to the prior art.

FIG. 6 is a circuit diagram of a conventional amplifier circuit in the semiconductor acceleration sensor 50 described above. Referring to FIG. 6, the acceleration signal output from the acceleration detection element 60 comprising four piezoresistances 65 is differentially amplified by the operational amplifier 70 of the differential amplification stage, temperature-corrected and inversion amplified by the operational amplifier 71 of the temperature correction stage, and is again inversion amplified by the operational amplifier 73 of the final amplification stage before being output. Note that the output terminal of the operational amplifier 71 of the temperature correction stage is connected through resistance 72 to the inverting input terminal of the operational amplifier 73 of the final amplification stage, the output terminal of said operational amplifier 73 is connected through resistance 74 to the inverting input terminal, and the output terminal of said operational amplifier 73 functions as the output terminal of the semiconductor acceleration sensor 50.

Figure 7:
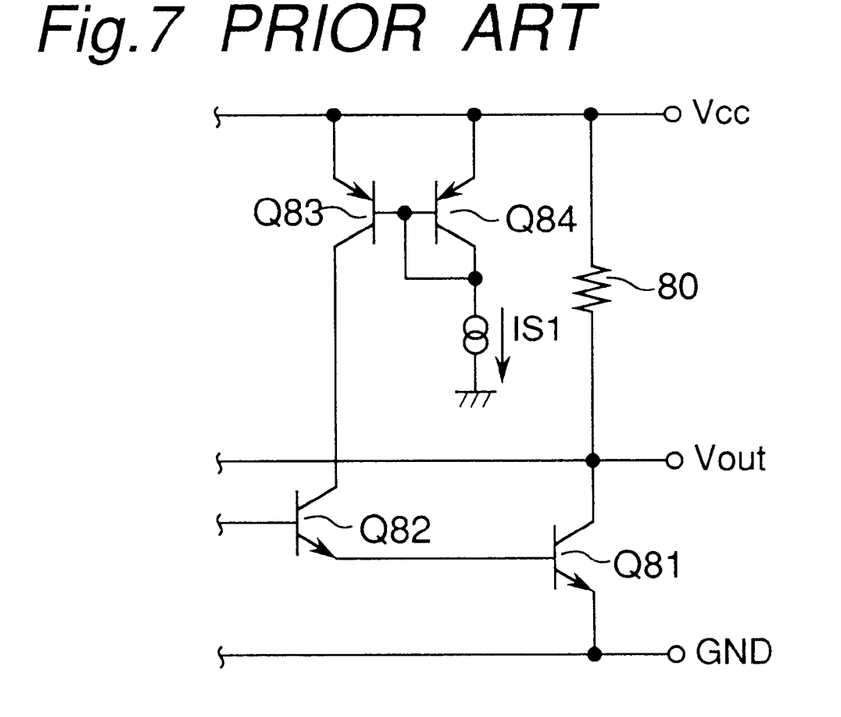
FIG. 7 is a circuit diagram of the output section of the operational amplifier 73 shown in FIG. 6.
Figure 8:
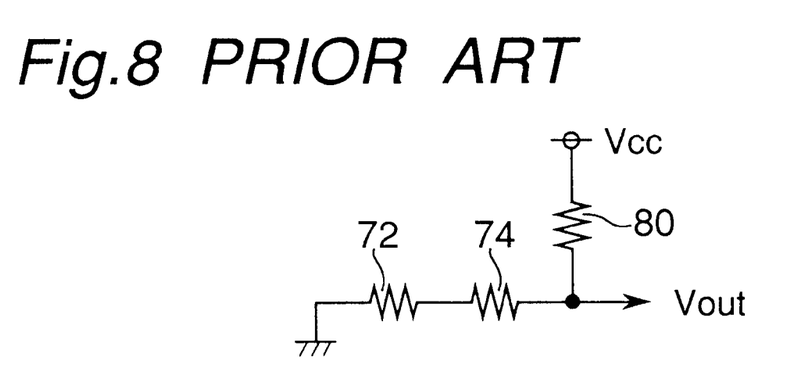
FIG. 8 is a diagram of the equivalent circuit formed by resistances 72, 74, and 80 when excessive acceleration acts on the semiconductor acceleration sensor shown in FIG. 6.

FIG. 7 is a circuit diagram showing the output section of the operational amplifier 73. As shown in FIG. 7, the output terminal of the operational amplifier 73 is pulled up to the supply voltage Vcc by resistance 80. Resistance 80 forms a supply path for the current output from the output terminal of the operational amplifier 73, and is used for self-diagnosis of the semiconductor acceleration sensor 50. Note that an equivalent circuit as shown in FIG. 8 is formed when over-acceleration acts on the semiconductor acceleration sensor 50; the voltage input from the operational amplifier 70 of the differential amplification stage to the inverting input terminal of the operational amplifier 71 of the temperature correction stage increases; the output voltage of the operational amplifier 71 of the temperature correction stage drops and the NPN transistor Q81 of the operational amplifier 73 of the final amplification stage becomes on; the voltage output from the output terminal of the operational amplifier 73, i.e., the output voltage Vout of the semiconductor acceleration sensor 50, thus becomes saturated, and the output voltage of the operational amplifier 71 equals the ground level.

The output voltage Vout from the output terminal of the semiconductor acceleration sensor 50 is thus dependent upon the voltage dividing ratio of resistance 72, resistance 74, and resistance 80, and can be calculated using equation [1]

$$\text{Vout} = \text{Vcc} \times (R72 + R74)/(R72 + R74 + R80) \qquad [1]$$

where R72, R74, and R80 are the resistance values resistances 72, 74, and 80, respectively.

Figure 9:
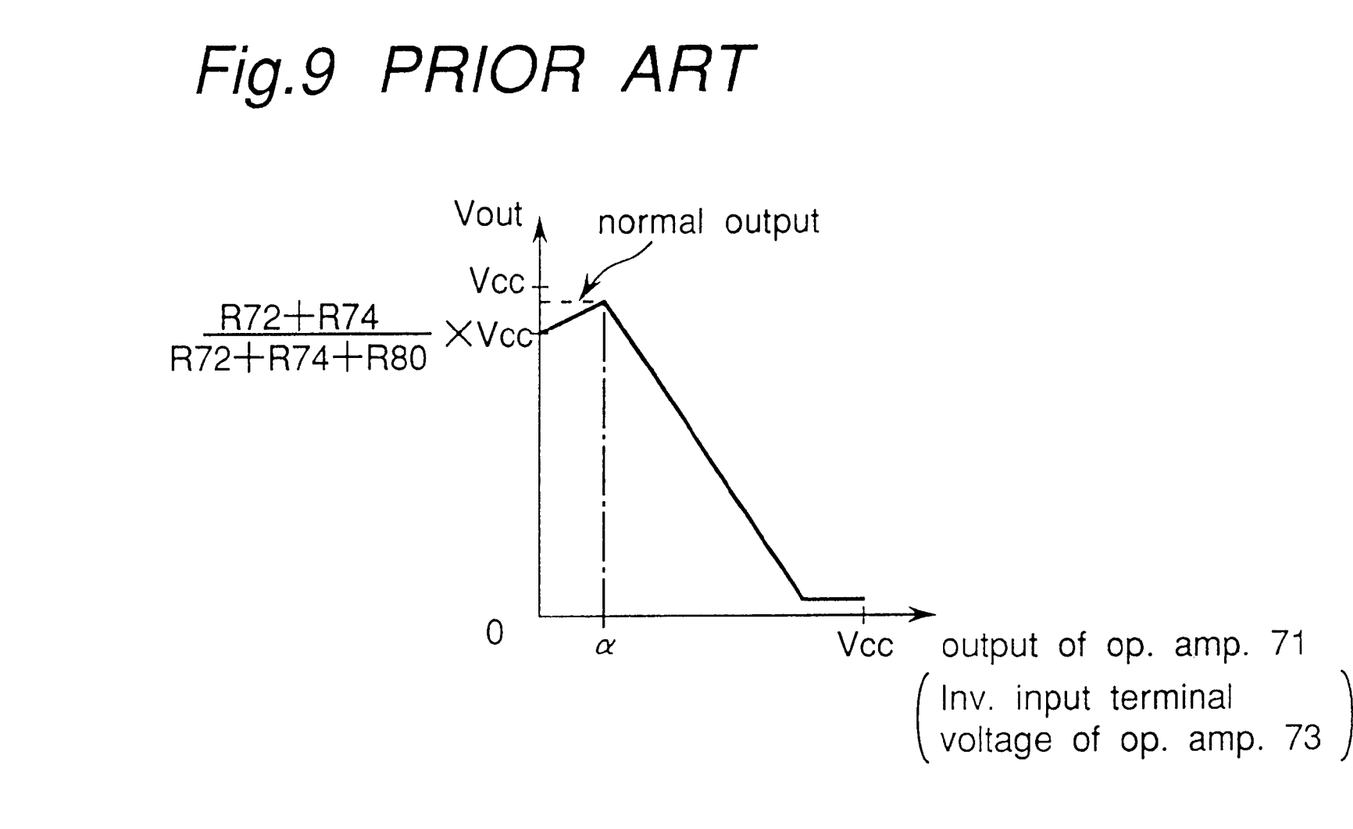
FIG. 9 is a graph showing the relationship between the output voltage from the operational amplifier 7, and the output voltage Vout of the semiconductor acceleration sensor 50, shown in FIG. 6.

FIG. 9 is a graph showing the relationship between the output voltage from the operational amplifier 71 of the temperature correction stage, and the output voltage Vout of the semiconductor acceleration sensor 50. When the output voltage from the operational amplifier 71 drops below the voltage level α at which the output voltage Vout is saturated, what should be saturated by output voltage Vout is not saturated. When the output voltage of the operational amplifier 71 drops further to the ground level, output voltage Vout is as defined by equation [1]. In other words, even though acceleration causing the output voltage Vout to be saturated is acting on the semiconductor acceleration sensor 50, the semiconductor acceleration sensor 50 detects acceleration to be less than the true acceleration.

SUMMARY OF THE INVENTION

An object of the present invention is therefore to eliminate such operational errors and improve the detection precision of a semiconductor sensor in which a pull-up resistance is connected to the output terminal of the operational amplifier of the final amplification stage.

To achieve the aforementioned object, a semiconductor sensor according to the present invention uses a semiconductor material for the sensor and has a circuit configuration in which the operational amplifier of the final amplification stage forms an inverting amplifier circuit, and a pull-up resistance is connected to the output terminal of said operational amplifier, and comprises a saturation means for saturating the output voltage of the operational amplifier of the final amplification stage when the voltage of the inverting input terminal of said operational amplifier drops below a voltage value α at which the output voltage from said output terminal is saturated. More specifically, said saturation means is a constant current supply connected in parallel to said pull-up resistance.

When a semiconductor sensor using a semiconductor material for the sensor and having a circuit configuration forming an inverting amplifier circuit in which the output of the operational amplifier of the final amplification stage is fed back through a resistance to the inverting input terminal, and a pull-up resistance is connected to the output terminal of said operational amplifier, further comprises a constant current supply connected in parallel to said pull-up resistance, it is possible to saturate the output voltage of the operational amplifier of the final amplification stage when the voltage of the inverting input terminal of said operational amplifier drops below a voltage value a at which the output voltage from said output terminal is saturated. It is therefore possible, for example, to saturate the output voltage from the output terminal of the sensor, i.e., the output terminal to which a pull-up resistance is connected in the operational amplifier of the final amplification stage. The present invention therefore provides a high precision semiconductor sensor free of operational errors resulting from an unsaturated output terminal voltage.

It is also possible to provide a limiting means for limiting the voltage input to the inverting input terminal of the operational amplifier of the final amplification stage so that the output of the operational amplifier of the final amplification stage is not saturated. More specifically, a clamping circuit may be connected to the output terminal of the circuit preceding the operational amplifier of the final amplification stage and connected through a resistance to the inverting input terminal of the operational amplifier of the final amplification stage. The clamping circuit can thus prevent the voltage of the inverting input terminal of the operational amplifier of the final amplification stage from dropping until the output voltage of the operational amplifier of the final amplification stage becomes saturated, and a high precision semiconductor sensor that will not misoperate can thus be provided.

A semiconductor sensor using a semiconductor material for the sensor and having a circuit configuration in which the operational amplifier of the final amplification stage forms an inverting amplifier circuit, and a pull-up resistance is connected to the output terminal of said operational amplifier, is characterized by limiting the voltage input to the inverting input terminal of the operational amplifier of the final amplification stage so that the output of the operational amplifier of the final amplification stage is not saturated. It is therefore possible to provide a high precision semiconductor sensor whereby the voltage input to the inverting input terminal of the operational amplifier of the final amplification stage is limited so that the output of the operational amplifier of the final amplification stage is not saturated and the semiconductor sensor is essentially free of operational errors when the semiconductor sensor is used as an acceleration sensor and excessive acceleration is applied.

BRIEF DESCRIPTION OF THE DRAWINGS

The present invention will become more fully understood from the detailed description given below and the accompanying diagrams wherein.

DESCRIPTION OF PREFERRED EMBODIMENTS

The preferred embodiments of the present invention are described below with reference to the accompanying figures.

Embodiment 1

Figure 1:
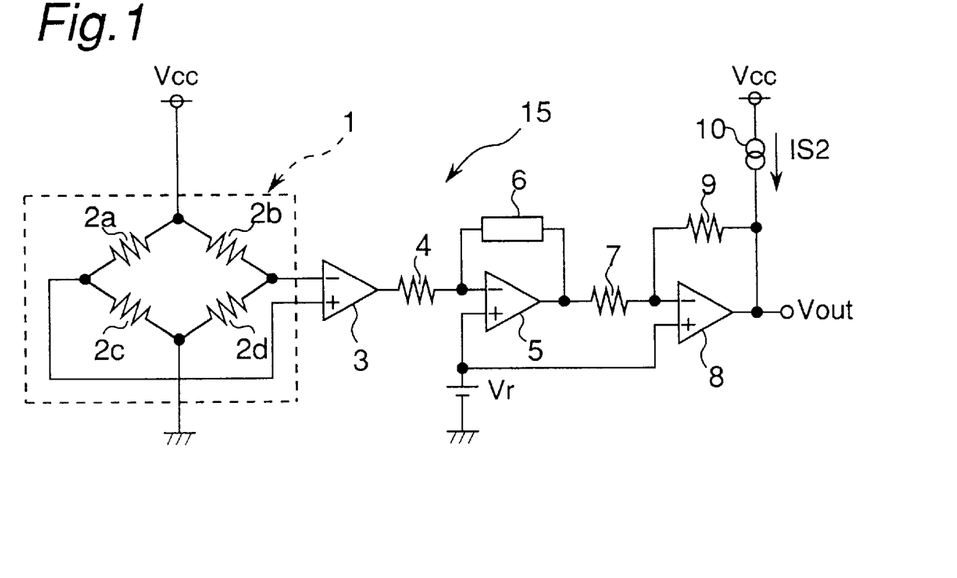
FIG. 1 is a circuit diagram of a semiconductor acceleration sensor according to the first embodiment of the present invention.

FIG. 1 is a circuit diagram of a semiconductor acceleration sensor according to the first embodiment of the present invention. Referring to FIG. 1, acceleration detection element 1 is a bridge circuit comprising four piezoresistances 2a, 2b, 2c, and 2d formed on the surface of the diaphragm in the sensor chip. The power supply voltage Vcc is applied to one bridge circuit input, i.e., the common connection between piezoresistances 2a and 2b, and the other input, i.e., the common connection between piezoresistances 2c and 2d, is grounded.

One bridge circuit output terminal, i.e., the common connection between piezoresistances 2a and 2c, is connected to the non-inverting input terminal of the operational amplifier 3 of the differential amplification stage, and the other bridge circuit output terminal, i.e., the common connection between piezoresistances 2b and 2d, is connected to the inverting input terminal of the operational amplifier 3. The output terminal of the operational amplifier 3 is connected through a resistance 4 to the inverting input terminal of the operational amplifier 5 of the temperature correction stage; the output terminal of said operational amplifier 5 is also connected in a feedback loop to its own inverting input terminal through a temperature compensation resistance circuit 6.

The output terminal of said operational amplifier 5 is also connected through a resistance 7 to the inverting input terminal of the operational amplifier 8 of the final amplification stage. The same reference voltage Vr is applied to the non-inverting input terminals of both operational amplifiers 5 and 8. The output terminal of the operational amplifier 8 of the final amplification stage is also connected in a feedback loop to the inverting input terminal thereof through a resistance 9. A constant current supply 10 is also connected between the power supply and the output terminal of the operational amplifier 8, and the output terminal of said operational amplifier 8 functions as the output terminal of the semiconductor acceleration sensor 15.

Note that the acceleration detection element 1 has a negative temperature characteristic, causing the voltage difference between the input terminals to the operational amplifier 3 of the differential amplification stage to drop, and the output voltage to also drop, when the temperature rises. The temperature compensation resistance circuit 6 connected to the operational amplifier 5 of the temperature correction stage therefore comprises one resistance or plural types of resistances, and has a positive temperature characteristic so that the circuitry of the temperature correction stage has a positive temperature characteristic, and can therefore cancel the temperature characteristic of the acceleration detection element 1. The temperature correction stage also forms an inverting amplifier circuit: the signal output from the operational amplifier 3 is inversely amplified by the operational amplifier 5 of the temperature correction stage, and is then input through resistance 7 to the inverting input terminal of the operational amplifier 8 of the final amplification stage.

The constant current supply 10 thus acts as the source of the current output from the output terminal of the semiconductor acceleration sensor 15 so that when excessive acceleration is applied to a semiconductor acceleration sensor 15 thus comprised, the voltage output from the differential amplification stage operational amplifier 3 to the inverting input terminal of the temperature correction stage operational amplifier 5 rises, the output voltage from the temperature correction stage operational amplifier 5 drops, and the voltage output from the output terminal of the final amplification stage operational amplifier 8, i.e., output voltage Vout output from the output terminal of the semiconductor acceleration sensor 15, is saturated. Note that the constant current supply 10 thus functions as the saturation means of the claims.

Figure 2:
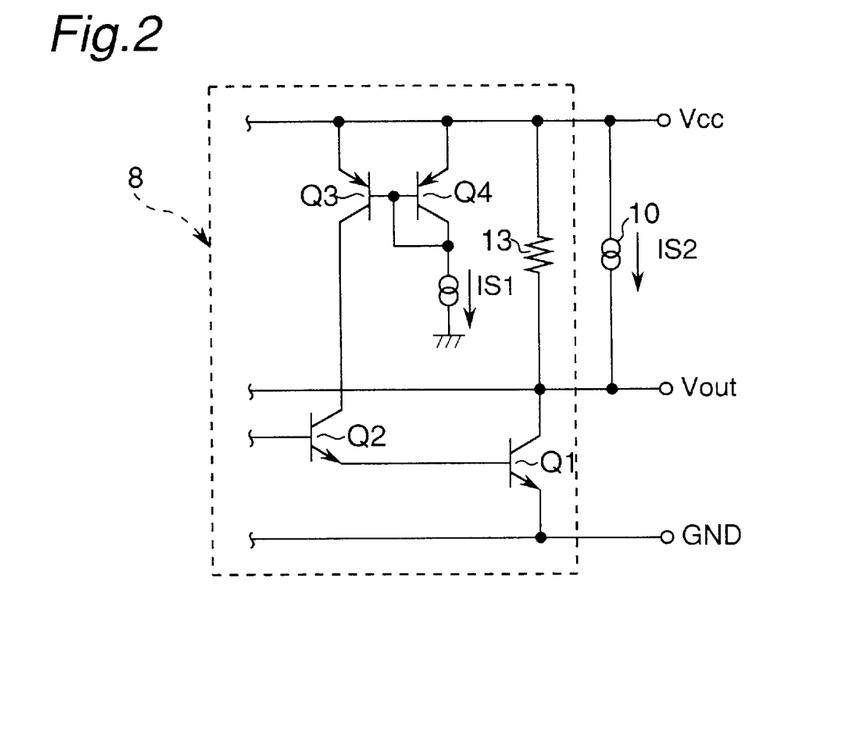
FIG. 2 is a circuit diagram of the output section of the operational amplifier 8 shown in FIG. 1.

FIG. 2 is a circuit diagram of the output section of the operational amplifier 8. As shown in FIG. 2, the output terminal of the operational amplifier 8 is pulled up to the supply voltage Vcc by resistance 13. Resistance 13 forms the supply path for the current output from the output terminal of the operational amplifier 8, and is used for self-diagnosis by the semiconductor acceleration sensor 15.

When excessive acceleration is applied to the semiconductor acceleration sensor 15, the voltage output from the differential amplification stage operational amplifier 3 to the inverting input terminal of the temperature correction stage operational amplifier 5 rises, the output voltage from the temperature correction stage operational amplifier 5 drops, the NPN transistor Q1 of the operational amplifier 8 of the final amplification stage turns off, and the output voltage Vout from the output terminal of the semiconductor acceleration sensor 15 is saturated. So that an equivalent circuit as shown in FIG. 7 is not formed even when the output voltage from the operational amplifier 5 is 0, a constant current IS2 is supplied by the constant current supply 10 to the output terminal of the semiconductor acceleration sensor 15 so that the output voltage Vout from the output terminal of the semiconductor acceleration sensor 15 is saturated when excessive acceleration acts on the semiconductor acceleration sensor 15.

The semiconductor sensor according to the first embodiment of the present invention thus forms an inverting amplifier whereby the output of the operational amplifier 8 of the final amplification stage is fed back through a resistance 9 to the inverting input terminal of said operational amplifier 8 with a pull-up resistance 13 also connected to the output terminal of said operational amplifier 8, and a constant current supply 10 is connected parallel to said pull-up resistance 13, so that the output voltage of the operational amplifier is saturated if the voltage of the inverting input terminal of said operational amplifier 8 equals the ground level. Thus, if, for example, excessive acceleration causing the output voltage Vout to be saturated is applied to the semiconductor acceleration sensor 15, the semiconductor acceleration sensor 15 will not detect the acceleration to be less than the true acceleration, and can indicate by saturating the output voltage Vout that excessive acceleration has been detected. It is therefore possible to achieve a high precision semiconductor acceleration sensor free of operating errors.

Embodiment 2

As described above, the first embodiment of the present invention assures that the output voltage is saturated when the output voltage of, for example, a semiconductor acceleration sensor must be saturated to indicate that excessive acceleration has been detected. It is also possible, however, to use a clamping circuit to limit the output voltage of the operational amplifier in the temperature correction stage so that the output voltage of said operational amplifier does not drop, i.e., does not drop below voltage level α in FIG. 9, until the output voltage of the operational amplifier in the final amplification stage is saturated. A semiconductor sensor using such a clamping circuit according to the present invention is described next as the second embodiment of the invention.

Figure 3:
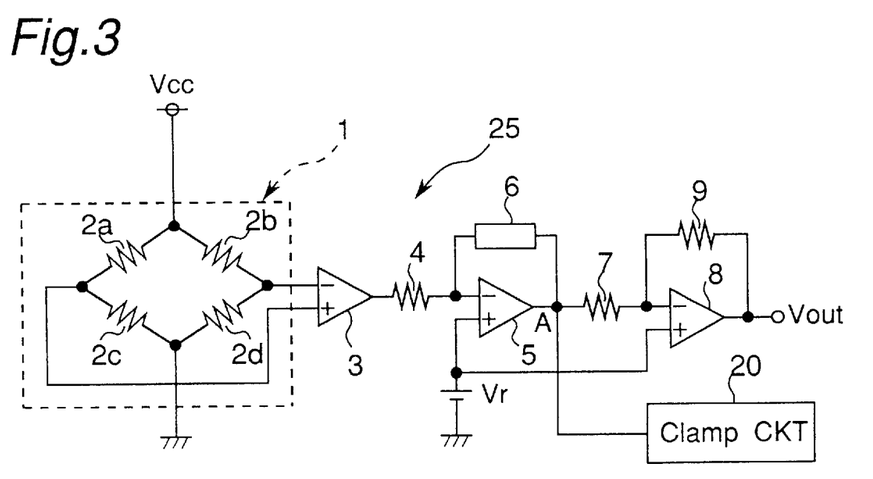
FIG. 3 is a circuit diagram of a semiconductor acceleration sensor according to the second embodiment of the present invention.

FIG. 3 is a circuit diagram of a semiconductor acceleration sensor circuit shown by way of example as the second embodiment of the present invention. Note that like parts are referred to by like references in FIGS. 1 and 3. Further description of such like parts is omitted below, and only the differences between the embodiments shown in FIGS. 1 and 3 are described.

The semiconductor acceleration sensor shown in FIG. 3 differs from that in FIG. 1 in the elimination of the constant current supply 10, and the connection of a clamping circuit 20 to the connection A between the output terminal of the temperature correction stage operational amplifier 5, temperature compensation resistance circuit 6, and resistance 7. The semiconductor acceleration sensor 15 is thus referenced as semiconductor acceleration sensor 25 below.

The output terminal of the operational amplifier 5 of the temperature correction stage is again connected through a resistance 7 to the inverting input terminal of the operational amplifier 8 of the final amplification stage, and the same reference voltage Vr is applied to the non-inverting input terminals of both operational amplifiers 5 and 8. As described above, a clamping circuit 20 is also connected to the connection A between the output terminal of said operational amplifier 5, temperature compensation resistance circuit 6, and resistance 7. The output terminal of the operational amplifier 8 of the final amplification stage is also feedback-connected to its own inverting input terminal through a resistance 9. The output terminal of the operational amplifier 8 also functions as the output terminal of the semiconductor acceleration sensor 25. The clamping circuit 20 functions as the limiting means of the claims.

Figure 4:
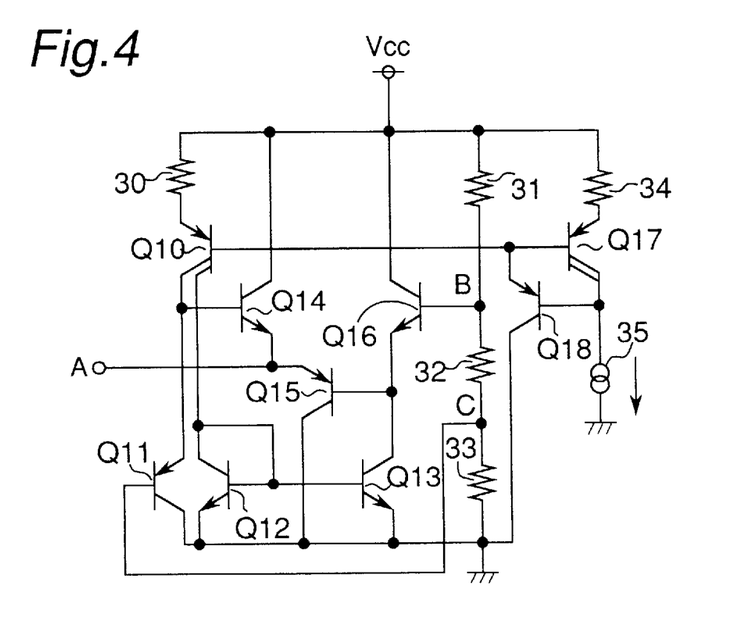
FIG. 4 is a circuit diagram of the clamping circuit 20 shown in FIG. 3.

FIG. 4 is a circuit diagram of the clamping circuit 20 in this embodiment. The operation of the clamping circuit 20 for limiting the output voltage of the operational amplifier 5 of the temperature correction stage is described below with reference to FIGS. 3 and 4.

As shown in FIG. 4, the clamping circuit 20 comprises two multiple-collector transistors Q10 and Q17; four NPN transistors Q12, Q13, Q14, and Q16; three PNP transistors Q11, Q15, and Q18; five resistances 30, 31, 32, 33, and 34; and a constant current supply 35. Note that the multiple-collector transistors Q10 and Q17 each have two collectors.

The emitter of multiple-collector transistor Q10 is connected through resistance 30 to the supply voltage Vcc source; one collector is connected to the emitter of PNP transistor Q11 with the base of NPN transistor Q14 also connected to this connection. The collector of the PNP transistor Q11 is grounded. The collector of NPN transistor Q14 is connected to the supply voltage Vcc source. The emitter of NPN transistor Q14 is connected to the emitter of PNP transistor Q15, and functions as the input/output terminal of the clamping circuit 20; the emitter of NPN transistor Q14 is thus connected to connection A in FIG. 3, and the collector of PNP transistor Q15 is grounded.

The other collector of the multiple-collector transistor Q10 is connected to the collector of NPN transistor Q12. The emitter of said NPN transistor Q12 is grounded, and the base is connected to the base of NPN transistor Q13. The two NPN transistors Q12 and Q13 thus form a current limiting circuit. The collector and emitter of NPN transistor Q12 are also connected, and the emitter of NPN transistor Q13 is grounded.

The emitter of NPN transistor Q16 is connected to the collector of NPN transistor Q13, and the base of PNP transistor Q15 is connected to this emitter-collector connection. The collector of NPN transistor Q16 is connected to the supply voltage Vcc source. Resistances 31, 32, and 33 are connected in a series circuit inserted between the supply voltage Vcc and the ground. The clamped voltage is determined by the resistance values of this series circuit resistances 31, 32, and 33 with connection B between resistances 31 and 32 connected to the base of NPN transistor Q16, and connection C between resistances 32 and 33 connected to the base of PNP transistor Q11.

The base of multiple-collector transistor Q10 is connected to the base of multiple-collector transistor Q17, and the connection therebetween is further connected to the emitter of PNP transistor Q18. The collector of PNP transistor Q18 is grounded, the base thereof is connected to both collectors of the multiple-collector transistor Q17, and the constant current supply 35 is connected between the ground and said base-collectors connection. The emitter of the multiple-collector transistor Q17 is connected through resistance 34 to the supply voltage Vcc source.

With this circuit design, if the voltage at connection C in FIG. 4 is 1 V, for example, the voltage applied to the base of NPN transistor Q14 is amplified to 1.6 V by adding the 0.6-V forward voltage between the emitter and base of PNP transistor Q11 to the supplied 1 V. Because the forward voltage between the base and emitter of NPN transistor Q14 is 0.6 V, NPN transistor Q14 is ON when the emitter voltage of NPN transistor Q14, i.e., the voltage at connection A, is less than 1 V, and the voltage of connection A will therefore never drop below 1 V.

Furthermore, if the voltage at connection B in FIG. 4 is 4 V, for example, the base voltage of PNP transistor Q15 is dropped from 4 V to 3.4 V by the 0.6-V forward voltage between the base and emitter of the NPN transistor Q16. Because the forward voltage between the emitter and base of PNP transistor Q15 is also 0.6 V, the PNP transistor Q15 remains ON until connection A becomes 4 V. The voltage of connection A is therefore held at 4 V and does not exceed 4 V.

By thus connecting a clamping circuit 20 as shown in FIG. 4 to connection A in FIG. 3, the voltage of connection A will be greater than the voltage of connection C and less than the voltage of connection B in FIG. 4. The voltage of connection A in FIG. 3 is thus clamped by the clamping circuit 20. Note that the voltage of connection A in FIG. 3 may be controlled to always be less than the value of voltage level α in FIG. 9, or may be simply clamped to not exceed voltage level α in this second embodiment of the invention.

A semiconductor sensor according to the second embodiment of the invention thus comprises a circuit configuration forming an inverting amplifier in which the output of the operational amplifier 8 of the final amplification stage is fed back to the inverting input terminal thereof through a resistance 9, a pull-up resistance 13 is connected to the output terminal of the operational amplifier 8, and a clamping circuit 20 is connected to the output terminal of the operational amplifier 5 of the temperature correction stage so that the output voltage from said operational amplifier 5 does not drop below a predetermined voltage level α. As a result, when the semiconductor sensor is used as a semiconductor acceleration sensor 25 and excessive acceleration causing the output voltage Vout to become saturated acts on the semiconductor acceleration sensor 25, the semiconductor acceleration sensor 25 will not detect the acceleration to be less than the true acceleration, and can correctly detect and indicate when excessive acceleration occurs. It is therefore possible by means of the present invention thus described to achieve a semiconductor acceleration sensor providing high precision without operational errors occurring.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A semiconductor device, comprising:
   a semiconductor sensor;
   a plurality of operational amplifiers for amplifying an output of said semiconductor sensor including a final stage operational amplifier which forms all inverting amplifier circuit; a pull-up resistance connected to an output terminal of said final stage operational amplifier, and saturation means for saturating said final stage operational amplifier when a voltage of the inverting input terminal of said final stage operational amplifier drops below a voltage value at which the final stage operational amplifier is saturated, wherein said saturation means is a constant current supply connected in parallel to said pull-up resistance.

2. A semiconductor device, comprising:

a semiconductor sensor;

a plurality of operational amplifiers for amplifying an output of said semiconductor sensor including a final stage operational amplifier which forms an inverting amplifier circuit in which an output of said final stage operational amplifier is fed back through a resistance to the input terminal of said final stage operational amplifier;

a pull-up resistance connected to the output terminal of said final stage operational amplifier;

a constant current supply, connected in parallel to said pull-up resistance, for saturating the output voltage of said final stage operational amplifier when a voltage of the inverting input terminal of said final stage amplifier drops below a voltage value at which the output voltage from said output terminal is saturated.

* * * * *